April 26, 1966 K. GANZHORN 3,248,030

MOVING RECORD CONTROL

Filed Jan. 18, 1961

INVENTOR
KARL GANZHORN

BY
Robert W. Berray
ATTORNEY

United States Patent Office

Patented Apr. 26, 1966

3,248,030

MOVING RECORD CONTROL

Karl Ganzhorn, Baden-Wurttemberg, Germany, assignor to International Business Machines Corporation, New York, N.Y., a corporation of New York Filed Jan. 18, 1961, Ser. No. 83,576
Claims priority, application Germany, Feb. 6, 1960, J 17,651
1 Claim. (Cl. 226—33)

Figure 1:
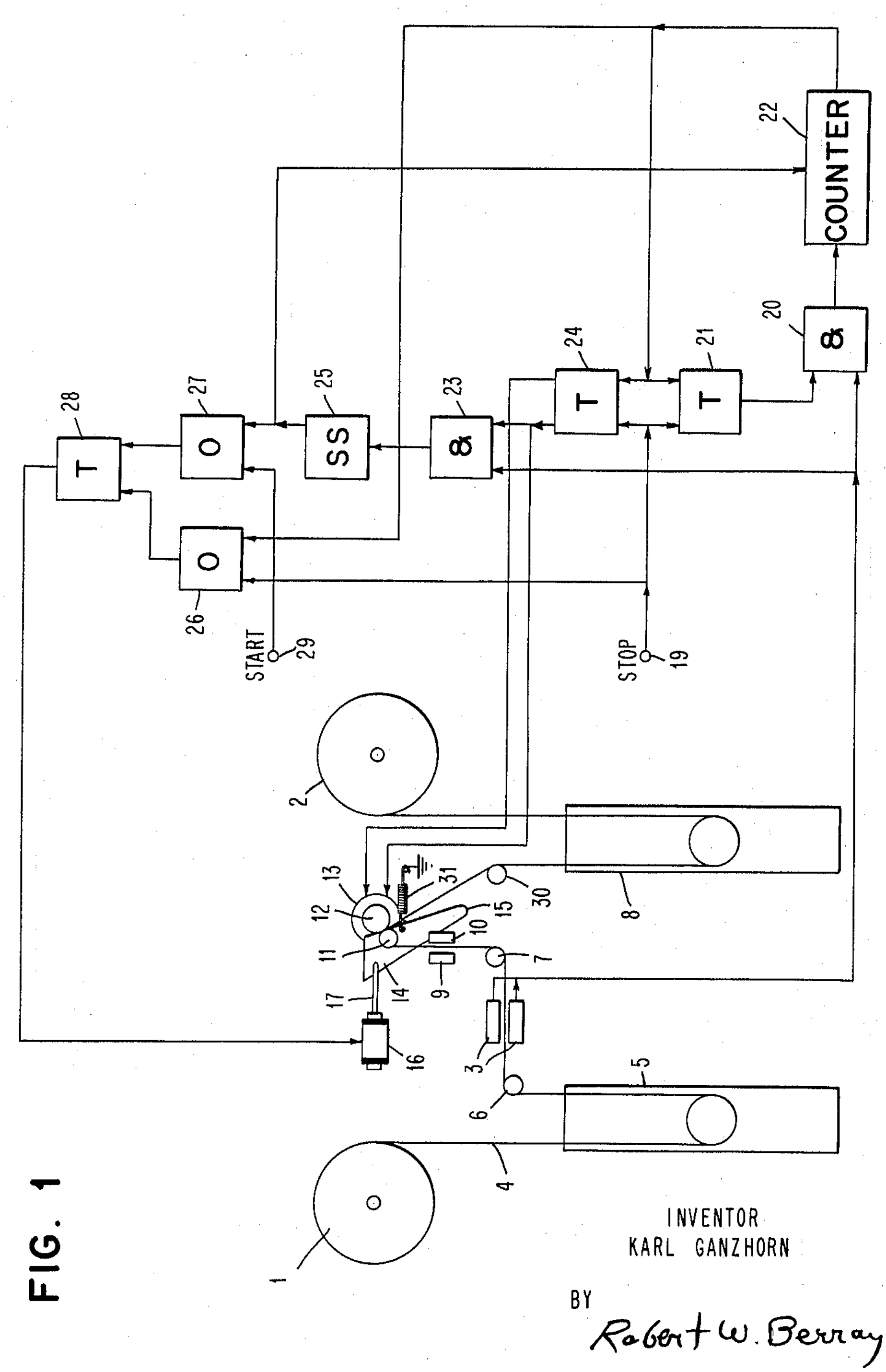

This invention relates to the control of a moving record and more specifically to the control of a moving record between a command to stop the record and a command to resume movement of the record.

Record carriers in the form of tapes are at present used for a great variety of purposes, e.g., as information carrying media for program controlled manufacturing machines. Special difficulties are encountered when the records contained on such a tape are sensed in groups or blocks rather than continuously, because the accelerating and decelerating processes caused thereby set very high standards for the mechanical properties of the tape.

Magnetics tapes meet such requirements at the speeds commonly used nowadays; however, examinations of punched tapes of paper running at particularly high speeds have shown that at relatively high speeds it is impossible to stop the tapes without damaging them in such a manner that after the stopping signal no character of the next recording block is sensed. The tapes rather require a certain deceleration time depending, e.g., on the brake pressure, the mass movement of inertia of the rollers and of the paper.

A paper tape moving at a relatively high speed, from which characters are sensed capacitively or photoelectrically, may require, from the stopping signal to the final standstill, a period of time in which additional characters are sensed which actually should only be included in the next sensing operation. When the tape starts its movement again, they are no longer available as they have already passed the sensing head. In order to avoid this deficiency, it would be necessary either to provide appropriate spaces between the individual recording blocks or to reduce the tape speed essentially. Both of these measures impair the efficiency of a system controlled by tape-shaped record carriers.

This invention eliminates the above-described deficiency by utilizing the experience that each sensing process of a block is followed by a certain interval of time in which the sensed information is being analyzed and the record carrier is not needed.

It is an object of the invention to greatly increase the speed at which a moving record can be moved without damaging effects when brought to a stop.

Another object of the invention is to reduce the braking force required to bring a moving record to a stop in order to present the character next following the stop command to the reading means immediately on resumption of the record movement.

A further object of the invention is to remove the need for non-information gaps between adjacent records which are read intermittently.

In accordance with the objects of this invention, an arrangement for stopping a rapidly moving record carrier to be sensed intermittently is designed in such a manner that the record carrier which is braked in any known manner is, after the standstill, moved back at a greatly reduced speed by the length of the decelerating distance covered since the arrival of the stopping signal. According to another feature of the invention, the decelerating distance is measured by counted designations contained in the record carrier, e.g., feed holes or timing marks.

The foregoing and other objects, features and advantages of the invention will be apparent from the following more particular description of a preferred embodiment of the invention, as illustrated in the accompanying drawing.

As shown in the schematic representation of a preferred embodiment of the invention, a punched tape 4 moves from a reel 1 through a vacuum column 5, over a roller 6, through a capacitive or photoelectric sensing head 3, over a roller 7, then passes between the brake shoes 9 and 10 and thereafter between a pinch roller 11 mounted on a swing support 14 and a drive roller 12, over a roller 30, through a second vacuum column 8 to a reel 2. In the reading direction, the drive roller 12 pulls the tape, which is pressed by the pinch roller 11 against the roller 12, from left to right through the sensing head 3. In the restoring direction, the tape is partly pushed from right to left by the roller 12, which in this case rotates in the opposite direction, and partly pulled by the suction of the vacuum column 5 and the rotation of the reel 1.

The drive roller 12 is mounted on the shaft of the motor 13, which is arranged in such a manner that during the return movement of the tape it runs at a lower speed and in a direction opposite to the feeding of the tape in the reading direction. The direction of rotation of the motor is determined by means of a trigger 24. Simultaneously with the change in the direction of rotation of the motor, the tape is also braked to a standstill. For this purpose, a brake magnet 16 is energized which through the connecting rod 17 pulls the swing support 14, which is pivoted at 15, to the left, thereby tensioning the spring 31. By virtue of this movement, the brake shoe 10, which is fixedly mounted on the swing support 14, presses against the shoe 9, thus clamping the punched tape running between the two brake shoes and effectively braking it to a standstill. At the same time, the tape running over the pinch roller mounted on the swing support 14, which due to the force of spring 31 is constantly pressed against the drive roller 12, is raised off the drive roller. Thus, the tape brake and the drive clutch are in their stopping position. When the magnet 16 is de-energized, the spring 31 will pull the tape brake and the drive clutch back into their driving positions. Control of the magnet 16 is effected by means of a trigger 28 for the tape brake and the drive clutch. The drive and the control of the reels 1 and 2 have not been shown herein.

Let it be assumed that the punched tape 4 is pulled by the drive roller 12 in the reading direction (from left to right) through the sensing head wherein it is sensed. For this purpose, the motor 13 runs with the drive roller 12 in a counterclockwise direction. The tape brake is released and thus the drive clutch is engaged.

A stop command may be derived from a special character on the punched tape or it may come directly from a computing machine into the stop hub 19. The stop pulse is applied to the switch 28 through OR circuit 26 to energize magnet 16 for the tape brake and drive clutch, to the motor switch 24 and to a counter control trigger 21. The switch 28 closes the circuit to the magnet 16 which is energized and thus, as described above, causes the tape brake to become effective and stops the tape drive. The motor switch 24 is set to the "restore" position, whereby the motor is reversed, i.e., its direction of rotation is changed. The counter switch 21 is closed conditioning AND circuit 20 enabling a counter 22 to accept counting pulses. The counting pulses may be derived from the capacitively sensed feed holes passing between the sensing electrodes or they may be derived from marks provided on the rollers 7 or 11, which may be sensed photoelectrically if the tape contains no feed holes. Another possibility is to derive the counting pulses from the holes representing the actual information. From the closure of the counter switch 21 until the complete standstill of the tape, the counting pulses applied from the sensing head 3 through the AND circuit 20 are now counted.

Counting of pulses continues until the tape comes to a complete stop. When trigger 24 is switched to reverse the motor 13, an AND circuit 23 is conditioned. The first counting pulse applied to AND 23 switches a single-shot 25 to its unstable state. Single-shot 25 remains in its unstable state until the tape stops coasting. The absence of counting pulses will cause single-shot 25 to return to its stable state producing a differentiated pulse to be applied to trigger 28 through an OR circuit 27 and a pulse to counter 22 causing it to be complemented. Therefore, the counter 22 now counts backward so to speak. Also, the trigger 28 for the tape brake and the drive clutch is switched, whereby the magnet 16 is dropped out thus disengaging the tape brake. The roller 11 again presses the tape 4 against the drive roller 12 which now turns clockwise at a greatly reduced speed for the return movement of the tape. Again, the counting pulses now produced during the return movement in the sensing head 3 are applied through the AND circuit 20 to the counter 22 until the counter 22 reaches its zero position at which time a pulse is generated. This is the case when the tape has moved back to a point where the first character of the new block to be sensed is in a position between the read electrodes. The zero pulse switches the trigger 28 through OR 26 causing the tape, which moves back at a substantially lower speed, to be stopped immediately by the now energized tape brake magnet 16. The zero pulse from counter 22 is also applied to trigger 24 which is set to the "forward" position, and to the counter control trigger 21 for blocking the application of pulses to the counter 22. The last mentioned three actions are performed simultaneously. Thus, the tape has now come to a full stop and is in its proper position with respect to the sensing electrodes for further sensing.

The arrangement is now ready to be started again. The start pulse is applied through the start hub 29 to the trigger 28 which then opens the circuit to the magnet 16, thereby opening the brake and driving the tape.

Without leaving the basic principle of the invention, it is also possible to use, instead of one single counter, two separate counters for counting the pulses during the forward and backward movements, the counts thereof being supervised by a comparer. Thereby it is avoided that a counter value has to be complemented.

The invention has disclosed means by which one is no longer interested in achieving very short decelerating times but accepts longer decelerating times and, after the arrival of the stopping signal, counts the number of feed holes passing the sensing head during the decelerating time. This counting process may readily be performed in view of the fact that in the punched tape technique a feed hole is punched in general for each punching position, even in those cases where no data or character designation is entered into the punched tape. Thereafter, the punched tape is moved back again by the counted number of feed holes at a reduced speed. Due to the reduced speed it is possible to stop the tape in its return movement between two successive characters, so that immediately after the next start, the first character of the next recording block will be below the sensing head. The same is also achievable with punched tapes containing no feed holes by counting the number of punched information characters. That method is, however, limited to those cases where the punched tape portions bearing no characters are not too long. Furthermore, it is also possible to provide the feed rollers with marks that may be sensed and counted.

Although in the described embodiment of the invention a punched tape is used, the invention is also applicable to other tape-shaped rocord carriers, e.g., magnetic tape. In this case, however, it has to be considered that during the low-speed return movement the sensing of the clocking track supplies smaller signals as in the sensing devices now commonly in use the amplitude is dependent on speed.

While the invention has been particularly shown and described with references to a preferred embodiment thereof, it will be understood by those skilled in the art that various changes in form and details may be made therein without departing from the spirit and scope of the invention.

What is claimed is:

A moving record carrier control comprising:

carrier driving and braking means alternatively operative to drive said carrier or stop said carrier, a reversible counter, a braking switch operative to render said braking means effective to decelerate and stop said carrier, a drive control switch operative to reverse the driving means, a counter control switch operative to enable said counter to count pulses produced by indicia read from said carrier related to the carrier movement, means to apply a switching pulse to each of said switches in response to a stop command whereby said brake is rendered effective, said driving means is reversed and said counter counts said indicia, pulse generating means responsive to cessation of pulses produced by the indicia when said carrier comes to a full stop, operative to cause said counter to count backwards and release said braking means to allow said driving means to drive said carrier in a reverse direction, and means associated with said counter to apply a pulse to all said switching means when said counter returns to zero to return said driving means to a forward direction, brake said carrier to an immediate stop and block indicia pulses to said counter.

References Cited by the Examiner

UNITED STATES PATENTS

| | | | |
|---|---|---|---|
| 2,553,410 | 5/1951 | Handschin. | |
| 2,824,736 | 2/1958 | Allen | 226—143 X |
| 2,942,875 | 6/1960 | Pastor | 226—143 |
| 3,045,884 | 7/1962 | Buhrendorf | 226—50 |

ROBERT B. REEVES, *Primary Examiner.*

JOSEPH P. STRIZAK, HARRISON R. MOSELEY, RAPHAEL M. LUPO, *Examiners.*

A. T. McKEON, *Assistant Examiner.*